United States Patent
Oiwa et al.

(10) Patent No.: US 9,534,571 B2
(45) Date of Patent: Jan. 3, 2017

(54) INTAKE DEVICE AND INTAKE CONTROL VALVE

(71) Applicant: AISIN SEIKI KABUSHIKI KAISHA, Kariya-shi (JP)

(72) Inventors: Toshiyuki Oiwa, Handa (JP); Yu Sakurai, Obu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 71 days.

(21) Appl. No.: 14/454,389

(22) Filed: Aug. 7, 2014

(65) Prior Publication Data
US 2015/0041013 A1    Feb. 12, 2015

(30) Foreign Application Priority Data

Aug. 8, 2013 (JP) ................. 2013-165538

(51) Int. Cl.
*F02D 9/10* (2006.01)
*F02M 35/10* (2006.01)
(Continued)

(52) U.S. Cl.
CPC .... *F02M 35/10255* (2013.01); *F02B 27/0273* (2013.01); *F02B 31/06* (2013.01); *F02D 9/106* (2013.01); *F02D 9/1095* (2013.01); *F02M 35/10144* (2013.01); *F02M 35/112* (2013.01); *F16K 1/223* (2013.01); *F16K 1/224* (2013.01); *F16K 27/0218* (2013.01);
(Continued)

(58) Field of Classification Search
USPC ......................................................... 123/336
See application file for complete search history.

(56) References Cited

U.S. PATENT DOCUMENTS 5,992,370 A * 11/1999 Pringle ................... F02B 27/02
                                                    123/184.55
6,135,418 A * 10/2000 Hatton .................. F02D 9/1015
                                                    137/884
(Continued)

FOREIGN PATENT DOCUMENTS

JP    2010-001847 A    1/2010
JP    2011-226301 A    11/2011

OTHER PUBLICATIONS

The extended European Search Report issued on Nov. 10, 2014, by the European Patent Office in corresponding European Patent Application No. 14179827.2-1606. (6 pages).

*Primary Examiner* — John Fox
(74) *Attorney, Agent, or Firm* — Buchanan Ingersoll & Rooney PC

(57) ABSTRACT

An intake device includes: a plurality of intake ports which are adjacent to each other with a partition wall interposed therebetween; a valve body provided for each of the plurality of intake ports; a rotating shaft which rotates along with the valve body; and a bearing member which is disposed between the intake ports adjacent to each other and rotatably supports the rotating shaft of the valve body, wherein the bearing member includes a bearing main body having a bearing hole which rotatably supports the rotating shaft, and an arm portion which extends in a length larger than an inner diameter of the bearing hole from the bearing main body along the partition wall between the intake ports adjacent to each other and configures a bearing-side welding portion.

11 Claims, 6 Drawing Sheets

(51) Int. Cl.
*F02M 35/112* (2006.01)
*F02B 27/02* (2006.01)
*F02B 31/06* (2006.01)
*F16K 1/22* (2006.01)
*F16K 27/02* (2006.01)

(52) U.S. Cl.
CPC ....... *F02M 35/10111* (2013.01); *Y02T 10/146* (2013.01); *Y10T 137/87708* (2015.04)

(56) References Cited

U.S. PATENT DOCUMENTS

| | | | |
|---|---|---|---|
| 7,162,997 B2 * | 1/2007 | Madeira | F02B 31/085 123/336 |
| 7,341,036 B2 * | 3/2008 | Akagawa | F02D 9/1095 123/184.53 |
| 7,353,801 B2 * | 4/2008 | Winkelmuller | F02D 9/1015 123/336 |
| 7,789,066 B2 * | 9/2010 | Torii | F02D 9/103 123/336 |
| 8,640,671 B2 * | 2/2014 | Iwata | F01L 7/18 123/188.1 |
| 2004/0261745 A1 | 12/2004 | Kito et al. | |
| 2005/0016487 A1 | 1/2005 | Ikuma et al. | |
| 2010/0059009 A1 | 3/2010 | Goldin et al. | |

\* cited by examiner

INTAKE DEVICE AND INTAKE CONTROL VALVE

CROSS REFERENCE TO RELATED APPLICATIONS

This application is based on and claims priority under 35 U.S.C. §119 to Japanese Patent Application 2013-165538 filed on Aug. 8, 2013, the entire contents of which are incorporated herein by reference.

TECHNICAL FIELD

This disclosure relates to an intake device and an intake control valve.

BACKGROUND DISCUSSION

In the related art, an intake device provided with a bearing member which rotatably supports a rotating shaft of a valve body between intake ports adjacent to each other is known (refer to, for example, JP 2010-1847A (Reference 1)).

Reference 1 described above discloses an intake device which is provided with an intake device main body that includes a surge tank and a plurality of intake ports branching from the surge tank to the downstream side, a valve body provided for each of the intake ports, a rotating shaft that rotates the valve bodies, and a bearing member that is disposed between intake ports adjacent to each other and rotatably supports the rotating shaft. The valve body is configured such that, if the valve body is rotated to a closed state, the valve body comes into contact with a partition wall portion configuring an opening portion of the intake port, thereby blocking (sealing) the opening portion (the intake port). The bearing member is fitted into a bearing mounting portion of a concave shape (a cutout shape) formed in a partition wall between the intake ports of the intake device main body, thereby being fixed to the partition wall between the intake ports. The intake device main body has a structure of being divided into plural pieces, welding portions are respectively formed on a side of the upper surfaces of the bearing member and the partition wall of a first piece and a lower surface side of a second piece, and these pieces are joined to each other by welding.

Here, if the dimensional accuracy of the partition wall portion in the vicinity of the opening portion of the intake port in which the bearing member is disposed is low, sealing properties of the valve body are adversely affected, and therefore, it is very important to secure dimensional accuracy in the vicinity of the opening portion of the valve body. However, in the intake device of Reference 1 described above, a sufficient thickness is required in the partition wall portion in order to fit the bearing member into the partition wall portion (the bearing mounting portion), and on the other hand, if the partition wall portion having a thick thickness in this manner exists, a molding defect easily occurs, and therefore, there is a problem in that it becomes difficult to secure dimensional accuracy in a thick portion (a partition wall portion in which a seal surface by the valve body is formed) in the vicinity of the bearing member.

Therefore, in order to secure dimensional accuracy, it is conceivable that the partition wall portion in the vicinity of the bearing member be made to have a hollow structure, thereby thinning the wall thickness of the partition wall while maintaining the total thickness of the partition wall.

However, on the side of the upper surfaces (welding surfaces) of the bearing member and the partition wall of the first piece, it is necessary to provide a welding portion which is welded to the second piece, and therefore, it is not possible to form a hole or the like for making a hollow structure therein. As a result, in the intake device of the related art as in Reference 1 described above, the partition wall portion (the seal surface by the valve body) in the vicinity of the bearing member becomes thick in wall thickness, and thus there is a problem in that it is difficult to secure the dimensional accuracy of the seal surface.

SUMMARY

Thus, a need exists for an intake device and an intake control valve which is not suspectable to the drawback mentioned above.

A first aspect of this disclosure is directed to an intake device including: a plurality of intake ports which are adjacent to each other with a partition wall interposed therebetween; a valve body provided for each of the plurality of intake ports; a rotating shaft which rotates along with the valve body; and a bearing member which is disposed between the intake ports adjacent to each other and rotatably supports the rotating shaft of the valve body, in which the bearing member includes a bearing main body having a bearing hole which rotatably supports the rotating shaft, and an arm portion which extends in a length larger than an inner diameter of the bearing hole from the bearing main body along the partition wall between the intake ports adjacent to each other and configures a bearing-side welding portion.

In the intake device according to the first aspect of this disclosure, as described above, by providing the bearing member which includes a bearing main body having a bearing hole which rotatably supports the rotating shaft, and an arm portion which extends in a length larger than the inner diameter of the bearing hole from the bearing main body along the partition wall between the intake ports adjacent to each other and configures a bearing-side welding portion, it is possible to make a range of the bearing-side welding portion along the partition wall between the intake ports adjacent to each other larger (longer) by an amount corresponding to providing the arm portion. In this way, with respect to a partition wall portion in which the arm portion of the bearing member is disposed (a partition wall portion which is located on the lower (back) side of the arm portion), the need to form a welding portion on the partition wall side is eliminated, and therefore, it is possible to form a hole or a groove for making a hollow structure in the partition wall from the welding surface side. As a result, it is possible to thin the wall thickness of a partition wall portion in the vicinity of the bearing member, which has been made thick in the related art, by forming a hole or a groove in the partition wall portion in which the arm portion (the bearing-side welding portion) of the bearing member is disposed, and therefore, it is possible to secure the dimensional accuracy of the partition wall portion (the seal surface by the valve body) in the vicinity of the bearing member.

A second aspect of this disclosure is directed to an intake control valve including: a valve body provided for each of a plurality of intake ports which are adjacent to each other with a partition wall interposed therebetween; a rotating shaft which rotates along with the valve body; and a bearing member which is disposed between the intake ports adjacent to each other and rotatably supports a rotating shaft of the valve body, in which the bearing member includes a bearing main body having a bearing hole which rotatably supports the rotating shaft, and an arm portion which extends in a length larger than an inner diameter of the bearing hole from the bearing main body along the partition wall between the intake ports adjacent to each other and configures a bearing-side welding portion.

In the intake control valve according to the second aspect of this disclosure, as described above, by providing the bearing member which includes a bearing main body having a bearing hole which rotatably supports the rotating shaft, and an arm portion which extends in a length larger than the inner diameter of the bearing hole from the bearing main body along the partition wall between the intake ports adjacent to each other and configures a bearing-side welding portion, it is possible to make a range of the bearing-side welding portion along the partition wall between the intake ports adjacent to each other larger (longer) by an amount corresponding to providing the arm portion. In this way, with respect to a partition wall portion in which the arm portion (the bearing-side welding portion) of the bearing member is disposed (a partition wall portion which is located on the lower side of the arm portion), the need to form a welding portion on the partition wall side is eliminated, and therefore, it is possible to form a hole or a groove for making a hollow structure in the partition wall from the welding surface side. As a result, it is possible to thin a wall thickness by forming a hole or a groove in the partition wall portion in which the arm portion (the bearing-side welding portion) of the bearing member is disposed, and therefore, it is possible to secure the dimensional accuracy of the partition wall portion (the seal surface by the valve body) in the vicinity of the bearing member of an intake device main body on which the intake control valve is mounted.

According to the first and second aspects of this disclosure, as described above, it is possible to secure the dimensional accuracy of the partition wall portion (the seal surface by the valve body) in the vicinity of the bearing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described based on the drawings.

The configuration of an intake device 100 according to an embodiment disclosed here will be described with reference to FIGS. 1 to 7.

Figure 1:
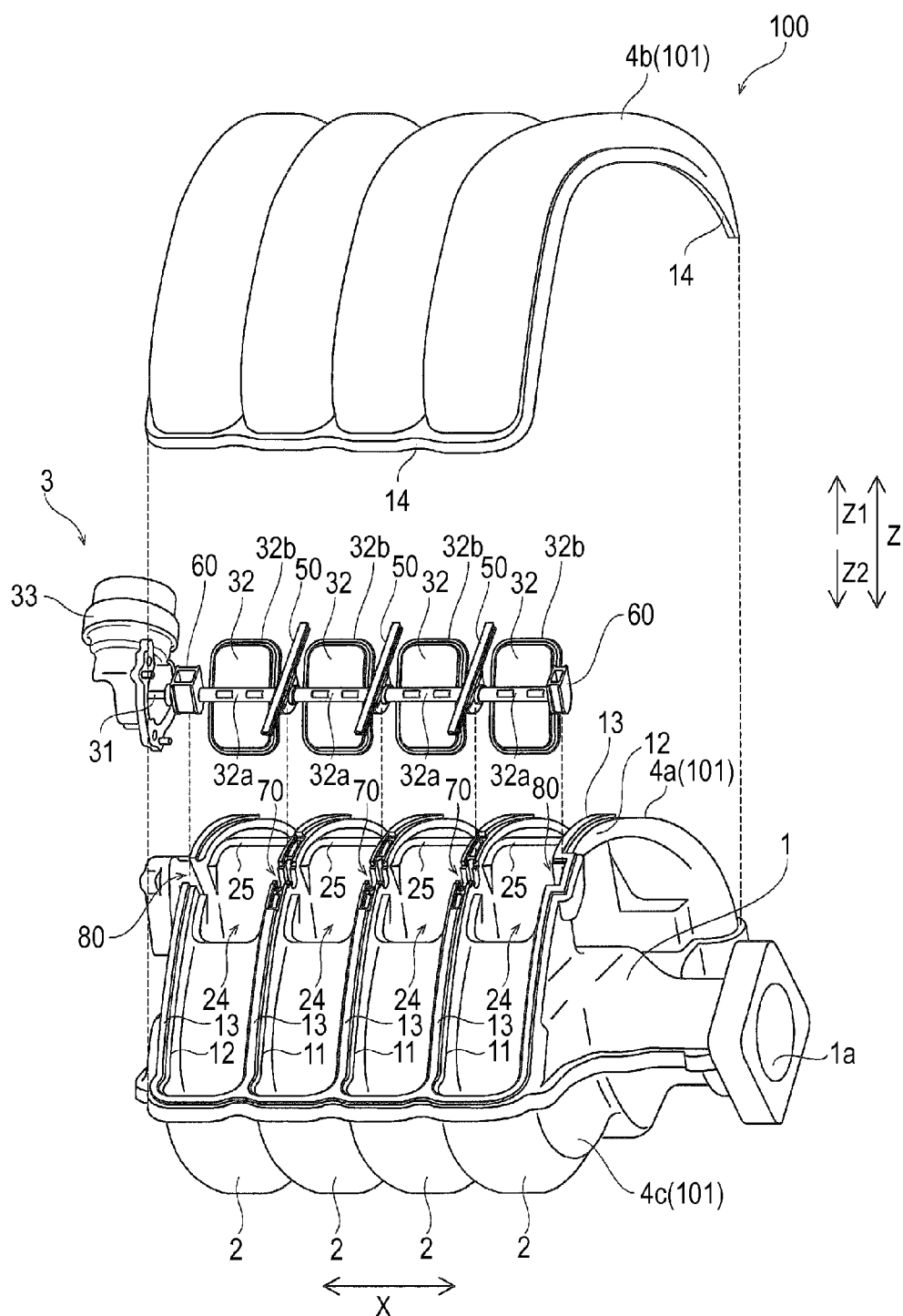
FIG. 1 is an exploded perspective view showing the configuration of an intake device according to an embodiment disclosed here.
Figure 2:
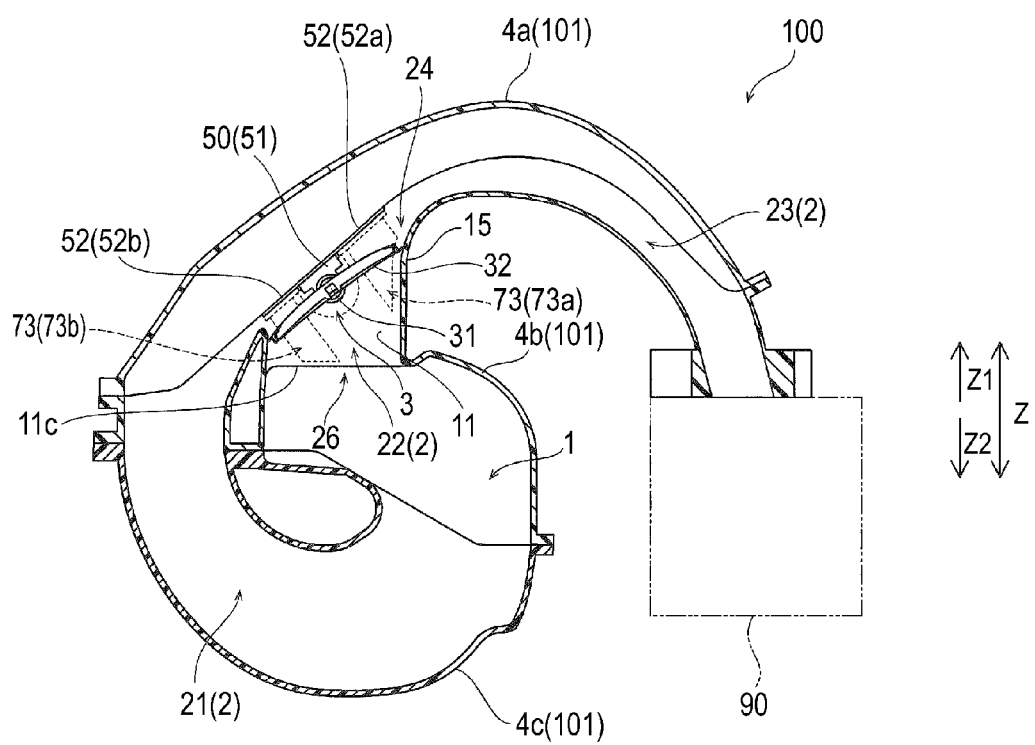
FIG. 2 is a schematic cross-sectional view taken along an intake port of the intake device according to the embodiment disclosed here.

The intake device 100 is an intake device which is provided in an in-line four-cylinder engine (not shown) for an automobile, as shown in FIG. 1. The intake device 100 is provided with a surge tank 1, four intake ports 2 branching from the surge tank 1 and disposed downstream of the surge tank 1, and an intake control valve 3 provided inside the four intake ports 2. Further, the intake device 100 structurally includes an intake device main body 101 which includes the surge tank 1 and the four intake ports 2 in an integrated manner. The intake device main body 101 is made of a resin material and made of, for example, nylon 6 (PA 6). Then, as shown in FIGS. 1 and 2, the intake control valve 3 is provided inside the intake device main body 101. The intake device 100 is connected to a cylinder head 90 (refer to FIG. 2) and the four intake ports 2 are respectively connected to the respective cylinders of an engine through the cylinder head 90.

The intake device main body 101 includes three main body portions 4a to 4c. In each of the main body portions 4a to 4c, a welding portion is formed along a joint portion with respect to each of the others. Then, in a state where the intake control valve 3 is mounted on the main body portion 4a, the main body portion 4b is integrally joined to the main body portion 4a from the upper surface side of the main body portion 4a by vibration welding and the main body portion 4c is integrally joined to the main body portion 4a from the lower surface side of the main body portion 4a by vibration welding. In addition, for convenience of description, as shown in FIG. 1, a Z1 direction on the main body portion 4b side is set to be an upward direction and a Z2 direction on the main body portion 4c side is set to be a downward direction. In addition, the main body portion 4a and the main body portion 4b respectively are an example of a "first intake device main body" in this disclosure and an example of a "second intake device main body" in this disclosure.

In detail, in the main body portion 4a, first welding portions 13 in the form of a line which extends along partition walls 11 between the four intake ports 2 and outer walls 12 are formed on the upper end surfaces of the partition walls 11 and the outer walls 12. Further, in the main body portion 4b on the upper side of the main body portion 4a, second welding portions 14 in the form of a line provided so as to be welded to the first welding portions 13 and extending along the partition walls 11 between the intake ports 2 and the outer walls 12 are formed on the lower end surfaces of the partition walls 11 and the outer walls 12. The main body portion 4a (the first welding portions 13) and the main body portion 4b (the second welding portions 14) are joined to each other, whereby a portion between the main body portion 4a and the main body portion 4b in the four intake ports 2 is configured. The joining of the main body portion 4c and the main body portion 4a are also the same, and corresponding welding portions are joined to each other, whereby the intake device main body 101 is configured. In addition, both the first welding portion 13 and the second welding portion 14 are an example of a "main body-side welding portion" in this disclosure.

As shown in FIG. 1, intake air arriving through an air cleaner and a throttle, none of which is shown, flows into the surge tank 1 from an inlet portion 1a. The four intake ports 2 are disposed side by side in a lateral direction (an X direction) so as to be adjacent to each other through the partition walls 11. As shown in FIG. 2, each of the four intake ports 2 includes a first port portion 21, a second port portion 22, and an outlet port portion 23 which is connected to a cylinder of an engine on the downstream side of the first port portion 21 and the second port portion 22. The first port portion 21 extends so as to detour from the surge tank 1 and is connected to the outlet port portion 23 on the downstream side. The second port portion 22 is provided so as to connect the surge tank 1 and the outlet port portion 23 through the intake control valve 3.

Further, the intake control valve 3 is configured so as to open and close an opening portion 24 which is located at a connection portion between the second port portion 22 and the outlet port portion 23. In a state where the intake control valve 3 is closed (refer to FIG. 2), a long port having a long intake path length is formed by the first port portion 21 and the outlet port portion 23, and in a state where the intake control valve 3 is opened (not shown), a short port having a short intake path length is formed by the second port portion 22 and the outlet port portion 23. In this way, the intake control valve 3 is configured such that it is possible to change an intake path length. That is, the intake control valve 3 functions as an intake control valve for a variable intake valve which changes an intake path length with respect to each cylinder of an engine by opening and closing the opening portion 24.

The intake control valve 3 is mainly provided with a rotating shaft 31 rotating along with a valve body 32, four valve bodies 32 opening and closing the second port portions 22 (the opening portions 24), an actuator 33 rotating the rotating shaft 31, bearing members 50 each rotatably supporting the rotating shaft 31 and the valve body 32, and end bearing members 60, as shown in FIG. 1. The actuator 33 is a negative pressure actuator which generates a driving force by the supply of negative pressure. In addition, the valve body 32 is an example of a "valve body for a variable intake valve" in this disclosure.

The rotating shaft 31 is made of a square metallic shaft which extends in a lateral direction orthogonal to the intake port 2 (a direction in which the four intake ports 2 are arranged) and passes through the four second port portions 22. The rotating shaft 31 is rotatably supported at both ends by the two end bearing members 60, each of which is disposed at an end bearing mounting portion 80 of the outer wall 12, and is rotatably supported at a middle portion by the three bearing members 50, each of which is disposed at a bearing mounting portion 70 of the partition wall 11. Further, in the following, an axial direction in which the rotating shaft 31 extends is referred to as the X direction.

In this embodiment, the valve body 32 is a valve body for a variable intake valve provided so as to change the length of the intake port 2 by opening and closing the opening portion 24 between the surge tank 1 and the intake port 2. A total of four valve bodies 32 are provided one for each of the four intake ports 2. The valve body 32 is made of a plate-shaped member made of a resin and has a substantially rectangular outer shape corresponding to the shape of the opening portion 24. Further, the valve bodies 32 are mounted on the rotating shaft 31 such that the rotating shaft 31 is inserted into shaft insertion portions 32a, each of which traverses a central portion in a longitudinal direction of the valve body 32 in the X direction, whereby the four valve bodies 32 rotate integrally with the rotating shaft 31. Both ends of the shaft insertion portion 32a protrude to the outside in the axial direction (the X direction) and are respectively rotatably supported by the bearing members 50 disposed on both sides of the valve body 32 or the end bearing member 60. In this way, the individual valve body 32 is rotatably supported by bearing members (the bearing member 50 and the end bearing member 60) and the rotating shaft 31 is also supported on the bearing members through the individual valve body 32.

A seal lip 32b made of rubber is provided at a peripheral edge portion of the valve body 32. On the other hand, a seal surface 25 which comes into contact with the valve body 32 in a closed state is formed at the opening portion 24 of the intake port 2. The seal lip 32b of the valve body 32 and the seal surface 25 of the intake port 2 (the opening portion 24) come into contact with each other, whereby the airtightness of the opening portion 24 in the closed state of the valve body 32 is improved. The intake control valve 3 is configured so as to simultaneously perform the opening and closing operations of the opening portions 24 in all the four intake ports 2 by rotating the four valve bodies 32 together by rotating the rotating shaft 31. In addition, for convenience, in FIG. 2, illustration of the seal surface 25 is omitted.

The bearing member 50 is made of a resin, disposed between intake ports 2 adjacent to each other, and configured so as to rotatably support the rotating shaft 31 and the shaft insertion portion 32a of the valve body 32. In this embodiment, a total of three bearing members 50 are respectively provided between intake ports 2 (between valve bodies 32) adjacent to each other. In addition, as shown in FIG. 1, the two end bearing members 60 of both ends of the rotating shaft 31 are respectively fixed by being inserted into the end bearing mounting portions 80 formed in the outer walls 12 of the intake device main body 101.

Figure 3:
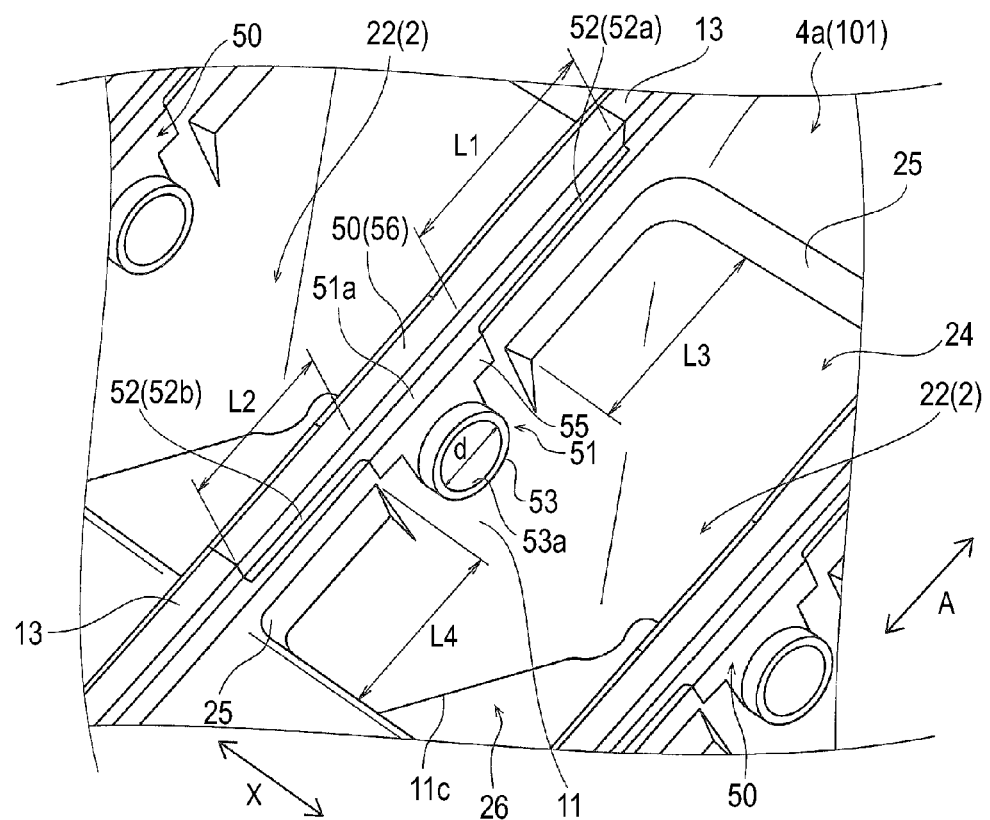
FIG. 3 is an enlarged perspective view showing a peripheral portion of a bearing member in the intake device according to the embodiment disclosed here.
Figure 4:
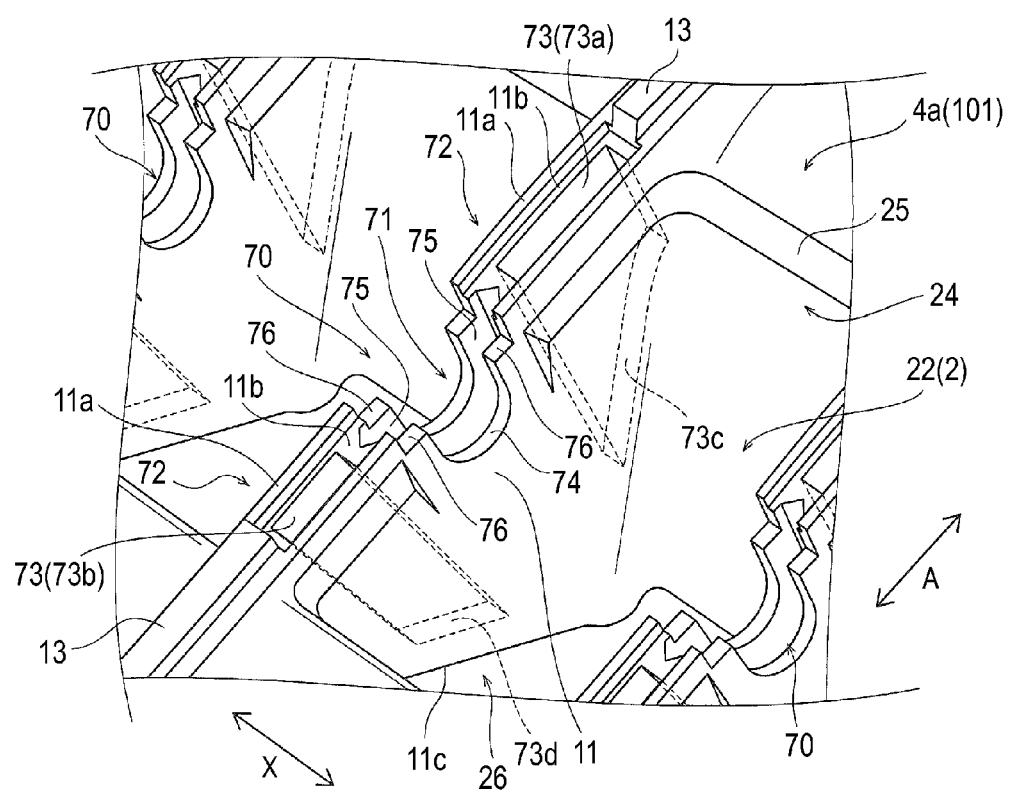
FIG. 4 is a diagram showing a state where a bearing mounting portion is exposed by removing the bearing member in FIG. 3.

As shown in FIGS. 3 and 4, each of the three bearing members 50 (refer to FIG. 3) is configured so as to be fixedly mounted by being inserted into the bearing mounting portion 70 (refer to FIG. 4) formed in the partition wall 11 between the intake ports 2 (the second port portions 22) adjacent to each other. In addition, in FIG. 3, for convenience, a state where only the bearing member 50 is mounted on the bearing mounting portion 70 is shown.

Figure 5:
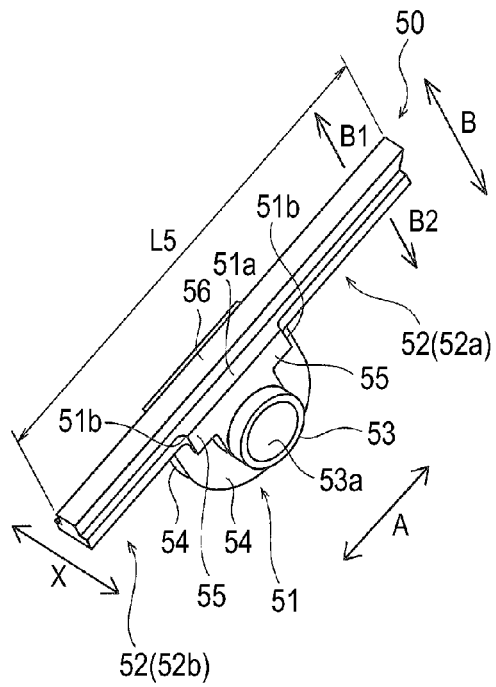
FIG. 5 is a perspective view showing the bearing member of the intake device according to the embodiment disclosed here.

As shown in FIG. 5, the bearing member 50 is a member made of a resin and is made of the same kind of material (for example, nylon 6 (PA 6)) as the intake device main body 101. The bearing member 50 includes a bearing main body 51 having a U-shape when viewed from the axial direction X (a thickness direction), and an arm portion 52 protruding from the bearing main body 51. The bearing main body 51 has a bearing hole 53a which rotatably supports the rotating shaft 31. The arm portion 52 extends from the bearing main body 51 along the partition wall 11 between the intake ports 2 adjacent to each other, as shown in FIG. 3, and configures a bearing-side welding portion 56 (described later). In addition, in the following, a direction along the partition wall 11 between the intake ports 2 adjacent to each other (that is, a longitudinal direction of the bearing member 50 (the arm portion 52)) is referred to as an A direction. Further, for a distinction from an up-and-down direction (a Z direction) of the entire device, a direction which is directed to the upper surface side (a B1 side on which the bearing-side welding portion 56 is provided) and the lower surface side (a B2 side opposite to the bearing-side welding portion 56) of the bearing member 50 is referred to as a B direction.

As shown in FIG. 5, the bearing main body 51 has a cylindrical portion 53 in which the bearing hole 53a is formed, a flange-shaped portion 54 formed on the outer peripheral surface of the U-shaped bearing main body 51, and a corner portion for positioning 55 formed in the form of a step at the bearing main body 51. The cylindrical portion 53 is a cylindrical portion protruding in the X direction that is the thickness direction of the bearing main body 51, and the inner surface side thereof becomes the bearing hole 53*a*. The rotating shaft 31 is inserted into the bearing hole 53*a* for each of the shaft insertion portions 32*a* of the valve bodies 32 and is rotatably supported therein.

The flange-shaped portion 54 is formed in the form of a flange (the shape of a plate erected from the outer peripheral surface) on the outer peripheral surface except for an upper surface 51*a* of the bearing main body 51. Although detailed illustration is omitted, the flange-shaped portions 54 are disposed in a pair (two) with a slight distance therebetween in the axial direction X on the outer peripheral surface of the bearing main body 51. The corner portion 55 is a rectangular portion formed so as to project to both sides in the longitudinal direction on the upper side of the cylindrical portion 53. The corner portions 55 are respectively provided on both sides in the X direction of the bearing main body 51.

Figure 6:
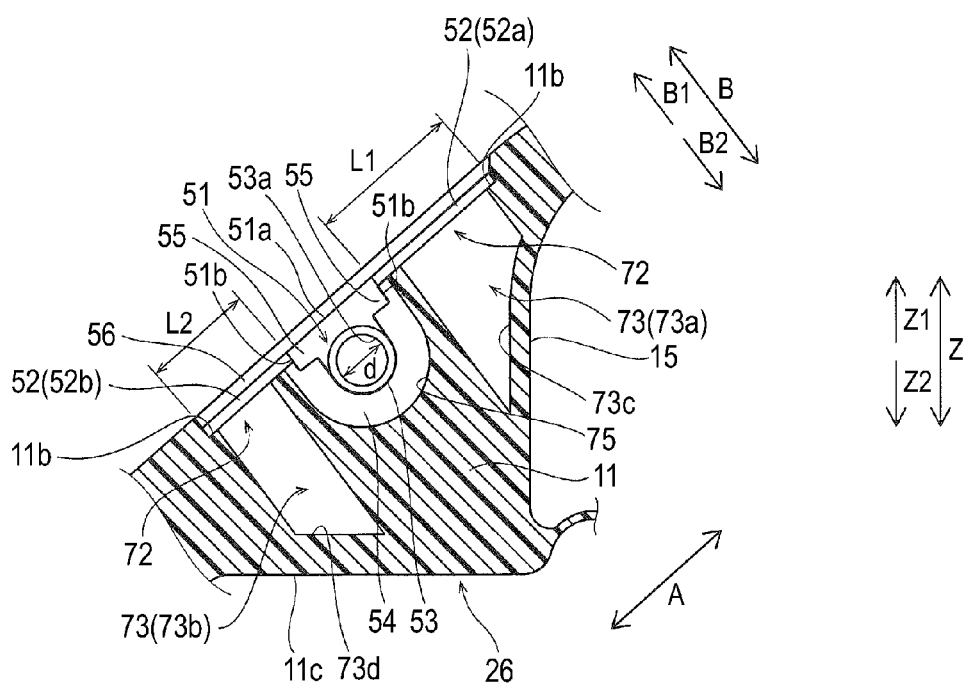
FIG. 6 is a partially enlarged cross-sectional view schematically showing a cross-section along an area between intake ports adjacent to each other in a partition wall portion with the bearing member mounted thereon.

The arm portion 52 is formed at an upper end portion of the bearing main body 51 and has the shape of a plate. The arm portion 52 is formed so as to extend from each of side end portions 51*b* on both sides of the bearing main body 51 to each of both sides in a direction (the longitudinal direction A) along the partition wall 11 between the intake ports 2. As shown in FIG. 6, the arm portion 52 is formed so as to extend in a length larger than an inner diameter d of the bearing hole 53*a* from the bearing main body 51 along the partition wall 11 between the intake ports 2 adjacent to each other. That is, the arm portions 52 have a length L1 (on a 52*a* side) and a length L2 (on a 52*b* side) in the longitudinal direction A, and each of the lengths L1 and L2 is larger than the inner diameter d of the bearing hole 53*a*.

Further, in this embodiment, the arm portion 52 is formed so as to extend in a length extending over a formation range of the seal surface 25 along the partition wall 11 between the intake ports 2. Specifically, as shown in FIG. 3, the seal surface 25 of the intake port 2 is circumferentially formed so as to surround the opening portion 24 of the second port portion 22 in which the valve body 32 is disposed. The arm portion 52 extends in a length extending over the approximately entire length of the formation range (a side along the A direction of the seal surface 25) along the partition wall 11 between the intake ports 2, of the seal surface 25 surrounding the opening portion 24. That is, the length L1 (on the 52*a* side) and the length L2 (on the 52*b* side) of the arm portions 52 respectively are approximately the same as lengths L3 and L4 of the formation range of the seal surface 25 along the A direction. In addition, since the seal surface 25 surrounds the opening portion 24, an entire length L5 (refer to FIG. 5) of the bearing member 50 which includes the arm portions 52 extending to both sides in the longitudinal direction A and the bearing main body 51 is in other words approximately the same as the length of the opening portion 24 along the longitudinal direction A. That is, each of a pair of arm portions 52 extending to both sides in the longitudinal direction A is formed so as to extend to the vicinity of each of both end portions of the opening portion 24 in the longitudinal direction A.

Further, as shown in FIG. 5, on the upper surface (the B1 side) of the arm portion 52, the bearing-side welding portion 56 is formed over the entire length in the longitudinal direction A. In addition, the bearing-side welding portion 56 is also formed on the upper surface 51*a* of the bearing main body 51. The arm portion 52 is provided so as to extend to be continuous to the upper surface 51*a* of the bearing main body 51 and configure a single continuous bearing-side welding portion 56 together with the upper surface 51*a* of the bearing main body 51. In this embodiment, the bearing-side welding portion 56 is formed so as to extend over the entire length in the longitudinal direction A of the bearing member 50 which includes the bearing main body 51 and the arm portion 52. Then, as shown in FIG. 3, the arm portion 52 configuring the bearing-side welding portion 56 of the bearing member 50 is formed so as to be connected to the first welding portion 13 of the main body portion 4*a*. In addition, the bearing-side welding portion 56 is formed in the form of a rib protruding from the upper surface, similar to the first welding portion 13 on the main body side, and extends in the form of a line in the longitudinal direction A. The width (the width in the axial direction X) of the arm portion 52 is larger than the width of the bearing-side welding portion 56 (refer to FIG. 7), and thus the arm portion 52 projects further to both sides in the axial direction X than the bearing-side welding portion 56.

As shown in FIG. 4, the bearing mounting portion 70 on which the bearing member 50 is mounted is provided at each of the three partition walls 11 which are disposed between the four intake ports 2 (second port portions 22) in the intake device main body 101 (the main body portion 4*a*).

The bearing mounting portion 70 is formed in a partition wall portion in the vicinity of the opening portion 24, of the partition wall 11 of the intake port 2, and has a concave shape corresponding to the outer shape of the bearing member 50. Specifically, the bearing mounting portion 70 includes a main body insertion portion 71 in which the bearing main body 51 is inserted, and a fitting concave portion 72 in which the arm portion 52 is disposed. In the periphery of the bearing mounting portion 70, of the partition wall 11, it is necessary to secure a total thickness t1 (refer to FIG. 7) for mounting the bearing member 50 on the partition wall 11. On the other hand, in this embodiment, a hollow structure (a hollow portion 73) is formed in a portion in which the arm portion 52 of the bearing member 50 is disposed, of the partition wall 11 between the intake ports 2 adjacent to each other. In this way, the wall thickness of the partition wall portion is reduced by an amount corresponding to the hollow structure while securing the total thickness t1 of the partition wall 11.

The main body insertion portion 71 includes a U-shaped insertion hole portion 74 in which the cylindrical portion 53 of the bearing main body 51 is inserted, seal groove portions 75 in which a pair of flange-shaped portions 54 is inserted, and step portions 76 projecting in the A direction from an upper end portion of the U-shaped insertion hole portion 74. The insertion hole portion 74 is formed so as to pass through each of the three partition walls 11 in the axial direction X in order to support the cylindrical portion 53 in a state where the rotating shaft 31 (the shaft insertion portion 32*a*) is inserted into the bearing hole 53*a*. The outer peripheral surface (the lower half) of the cylindrical portion 53 is supported in contact with the inner peripheral surface of the U-shaped insertion hole portion 74.

The seal groove portion 75 is formed such that a leading end has a tapered shape. If the pair of flange-shaped portions 54 of the bearing main body 51 is inserted into the seal groove portions 75, a leading end portion of each of the flange-shaped portions 54 comes into contact with a tapered inner surface portion of each of the seal groove portions 75 and is bent inward in the thickness direction (the X direction). In this way, a contact state between the flange-shaped portion 54 and the inner surface of the partition wall 11 (the inner wall surface of the seal groove portion 75) is secured, and thus airtightness in a portion defined by the bearing main body 51 between the intake ports 2 adjacent to each other is secured. Further, the step portions 76 are formed to correspond to the corner portions 55 of the bearing main body 51. The end surface (each end surface in the A direction and the B direction) of the step portion 76 and the corner portion 55 of the bearing main body 51 come into contact with each other, whereby the center position of the rotating shaft 31 in a mounted state (refer to FIG. 3) of the bearing member 50 is positioned.

The fitting concave portion 72 of the bearing mounting portion 70 is formed so as to correspond to the arm portion 52 of the bearing member 50 in the upper surface of the partition wall 11 between the intake ports 2 and is configured such that the arm portion 52 is fitted thereinto. That is, the fitting concave portion 72 is formed in approximately the same concave shape as the outer shape of the arm portion 52 in a plan view. In a state where the arm portion 52 is fitted into the fitting concave portion 72, the arm portion 52 is supported and positioned by the inner surface of the partition wall 11 configuring the fitting concave portion 72. In addition, the fitting concave portions 72 are formed on both sides in the longitudinal direction A to correspond to the arm portions 52 (52a and 52b) extending from the bearing main body 51 to both sides in the longitudinal direction A. The respective fitting concave portions 72 have the same configuration except the lengths in the longitudinal direction A are different from each other.

Figure 7:
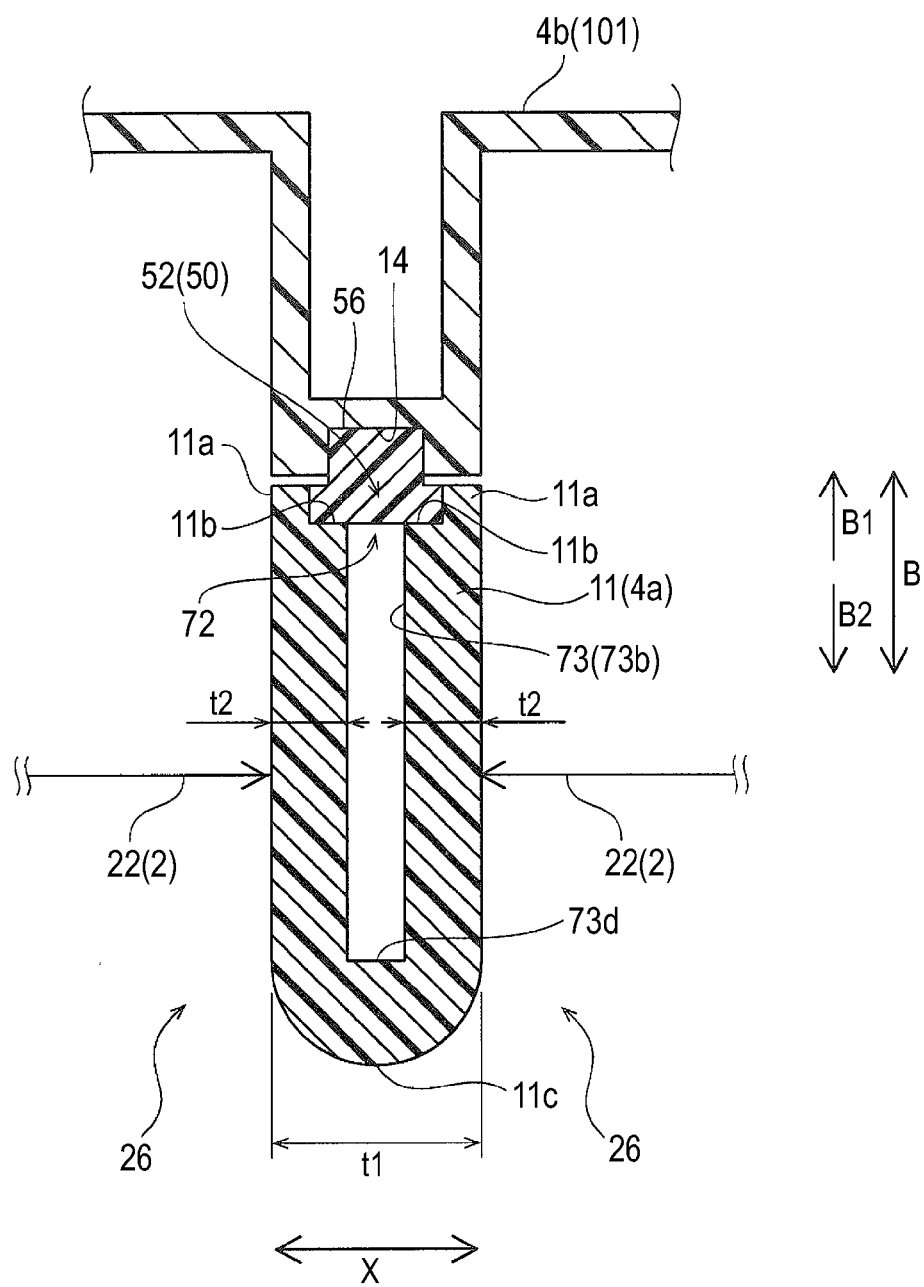
FIG. 7 is a partially enlarged cross-sectional view schematically showing the shape of a cross-section taken along an array direction of the intake ports and passing through an arm portion of the bearing member and a hollow portion of a partition wall in the partition wall portion between intake ports adjacent to each other.

In the fitting concave portion 72, as shown in FIGS. 4 and 7, the side surface thereof is configured by a wall-like portion 11a of the partition wall 11 and the bottom surface thereof is configured by a pedestal portion 11b of the partition wall 11. The wall-like portion 11a of the partition wall 11 is formed so as to surround the arm portion 52 (in the longitudinal direction A and the axial direction X) and comes into contact with the end surface on the longitudinal direction A side and the end surface on the axial direction X side of the arm portion 52. Further, the pedestal portion 11b is a flat portion of a step portion formed at a position recessed by one step from the upper end surface of the wall-like portion 11a to the lower side (the B2 side). The pedestal portion 11b is formed in the form of a rectangular ring so as to follow the wall-like portion 11a surrounding the arm portion 52. In this way, the pedestal portion 11b is configured so as to support an outer peripheral border portion of the lower surface of the arm portion 52. As shown in FIG. 7, the depth of the fitting concave portion 72 (the vertical position of the pedestal portion 11b) corresponds to the thickness of the arm portion 52, and in a state where the arm portion 52 is fitted into the fitting concave portion 72, the upper surface of the arm portion 52 and the upper surface of the wall-like portion 11a are substantially flush with each other.

When the bearing-side welding portion 56 of the arm portion 52 is joined by vibration welding, a pressing force is applied to the arm portion 52 from the upper surface side (the B1 side) with respect to the bearing-side welding portion 56 and a welding target (a welding portion on the main body portion 4b side) and the arm portion 52 relatively move (vibrate) in a welded surface. For this reason, the wall-like portion 11a has a function to determine the position (the positions in the longitudinal direction A and the axial direction X) of the arm portion 52 in the upper surface of the partition wall 11 and fix the arm portion 52 in a plane. Further, the pedestal portion 11b has a function to support the arm portion 52 against a pressing force which is applied from the upper surface side of the arm portion 52.

Here, in this embodiment, the hollow structure formed in the partition wall 11 is disposed at the center of the inside of the fitting concave portion 72. Specifically, the hollow structure is configured by the hollow portion 73 formed in an area which is surrounded by the ring-shaped pedestal portion 11b. As shown in FIG. 6, the hollow portion 73 is formed so as to extend from the side on which the arm portion 52 in the B direction is disposed (the upper side, the B1 side), to the opposite side (the lower side, the B2 side) to the side on which the arm portion 52 is disposed. Here, the shapes of the hollow portions 73 are different from each other on one side (73a) in the longitudinal direction A and the other side (73b) according to the respective formation positions.

Both the hollow portions 73a and 73b have a rectangular shape (refer to FIG. 4) in a plan view and are formed so as to extend in the B2 direction on the lower side while maintaining the rectangular shape. A bottom portion 73c of the hollow portion 73a is formed so as to curve along the outer shape of the main body portion 4a (the shape of the second port portion 22), as shown in FIGS. 6 and 2. That is, the hollow portion 73a is formed so as to extend to the vicinity of an outer wall 15 of the main body portion 4a configuring the second port portion 22.

A bottom portion 73d of the hollow portion 73b has a flat shape inclined along a lower end surface 11c of the partition wall 11, which is equivalent to an inlet portion 26 of the second port portion 22. More specifically, the partition wall 11 in the inlet portion 26 of the second port portion 22 is formed to have an approximately arc-shaped cross-sectional shape (a so-called funnel shape) in order to improve the intake efficiency of the intake port 2 (the second port portion 22), as shown in FIG. 7. The bottom portion 73d of the hollow portion 73b is disposed in the vicinity of the arc-shaped outer surface of the partition wall 11 in the inlet portion 26. That is, the hollow portion 73b is formed so as to extend to the vicinity of the lower end surface 11c of the partition wall 11 between the intake ports 2 (the inlet portion 26 of the second port portion 22), as shown in FIG. 6.

As shown in FIG. 7, in the formation portions of the hollow portions 73 (73a and 73b), of the partition wall 11, with respect to the total thickness t1 of the partition wall 11, partition wall portions having a wall thickness t2 are formed in a pair so as to sandwich the hollow portion 73 therebetween. As a result, compared to a case where a partition wall has a solid structure in which a wall thickness is equal to a total thickness, the partition wall 11 is thinned in wall thickness by an amount corresponding to the formation of the hollow portion 73. In addition, in FIG. 7, a cross-section taken to pass through the arm portion 52b and the hollow portion 73b along the X direction is schematically shown. However, with respect to the structure of a cross-section, a cross-section taken to pass through the arm portion 52a and the hollow portion 73a is also approximately the same.

Next, a welding structure between the bearing member 50 and the main body portions 4a and 4b will be described.

As shown in FIG. 1, when assembling the intake control valve 3 to the main body portion 4a, in a state where the four valve bodies 32 and the bearing members 50 are mounted on the rotating shaft 31, the respective bearing members 50 are mounted on the bearing mounting portions 70 (refer to FIG. 4) between the intake ports 2. At this time, the bearing main body 51 is positioned and fixed by being inserted into the main body insertion portion 71 shown in FIG. 4. Then, the arm portion 52 is positioned and fixed by being fitted into the fitting concave portion 72, as shown in FIG. 7.

In a state where each bearing member 50 is mounted on the bearing mounting portion 70, as shown in FIG. 3, the first welding portion 13 of the partition wall 11 itself and the bearing-side welding portion 56 formed at the bearing main body 51 and the arm portion 52 of the bearing member 50 are connected, and thus a line of a series of welding ribs is configured on the upper surface of the partition wall 11 between the intake ports 2. That is, at the formation portion of the bearing mounting portion 70 in the partition wall 11 of the main body portion 4a, the first welding portion 13 is not formed (refer to FIG. 4) and the bearing member 50 is mounted on the bearing mounting portion 70, whereby a welding line composed of the first welding portion 13 and the bearing-side welding portion 56 is configured.

Next, the main body portion 4a with the bearing member 50 mounted thereon and the main body portion 4b are joined to each other by vibration welding. As a result, the bearing-side welding portion 56 is welded to the second welding portion 14 (refer to FIG. 1) of the main body portion 4b together with the first welding portion 13 of the partition wall 11, thereby being fixed to the main body portion 4b. In this way, the arm portion 52 of the bearing member 50 and the main body portion 4a are welded to the main body portion 4b in a state where the bearing member 50 is mounted on the main body portion 4a.

In this embodiment, it is possible to obtain the following effects.

In this embodiment, as described above, by providing the bearing member 50 which includes the bearing main body 51 having the bearing hole 53a rotatably supporting the rotating shaft 31, and the arm portion 52 extending in a length larger than the inner diameter d of the bearing hole 53a from the bearing main body 51 along the partition wall 11 between the intake ports 2 adjacent to each other and configuring the bearing-side welding portion 56, it is possible to make a range of the bearing-side welding portion 56 along the partition wall 11 between the intake ports 2 adjacent to each other larger (longer) by an amount corresponding to providing the arm portion 52. In this way, with respect to the partition wall portion (the formation area of the fitting concave portion 72 which is located on the lower side of the arm portion 52) in which the arm portion 52 (the bearing-side welding portion 56) of the bearing member 50 is disposed, the need to form the first welding portion 13 in the partition wall 11 is eliminated, and therefore, it is possible to form a hole or a groove such as the hollow portion 73 from the welding surface side. As a result, it is possible to thin a wall thickness by forming the hollow portion 73 in the partition wall portion in which the arm portion 52 (the bearing-side welding portion 56) of the bearing member 50 is disposed, and therefore, it is possible to secure the dimensional accuracy of the partition wall portion (the seal surface 25 by the valve body 32) in the vicinity of the bearing member 50.

Further, in this embodiment, as described above, the hollow structure (the hollow portion 73) is formed in the portion in which the arm portion 52 of the bearing member 50 is disposed, of the partition wall 11 between the intake ports 2 adjacent to each other. In this way, it is possible to easily thin a wall thickness by making the partition wall portion in which the arm portion 52 (the bearing-side welding portion 56) of the bearing member 50 is disposed (the partition wall portion which is located on the lower side of the arm portion 52) hollow, and therefore, it is possible to easily secure the dimensional accuracy of the partition wall portion (the seal surface 25) in the vicinity of the bearing member 50.

Further, in this embodiment, as described above, the arm portion 52 is formed so as to extend to be continuous to the upper surface 51a of the bearing main body 51 and configure the bearing-side welding portion 56 together with the upper surface 51a of the bearing main body 51. In this way, it is possible to solidly fix the entirety of the upper surface portion of the bearing member 50 by welding and it is possible to obtain high airtightness in a joint portion of the bearing-side welding portion 56.

Further, in this embodiment, as described above, the arm portion 52 of the bearing member 50 is formed so as to extend from each of the side end portions 51b on both sides of the bearing main body 51 to each of both sides in the A direction along the partition wall 11 between the intake ports 2. In this way, it is possible to provide the arm portion 52 in a wide range on both sides of the bearing main body 51. In this way, it is possible to thin the wall thickness of the partition wall portion in a wide range around the bearing member 50, and therefore, it is possible to secure the dimensional accuracy of the partition wall portion in a wider range around the bearing member 50.

Further, in this embodiment, as described above, the arm portions 52 of the bearing member 50 are formed so as to extend in lengths (L1 and L2) extending over the formation range (ranges of the lengths L3 and L4) of the seal surface 25 along the partition wall 11 between the intake ports 2. In this way, it is possible to thin the wall thickness of the partition wall portion over the entire formation range of the seal surface 25, and therefore, it is possible to secure the dimensional accuracy of the partition wall portion (the seal surface 25) in the entire formation range of the seal surface 25 which requires high dimensional accuracy.

Further, in this embodiment, as described above, the fitting concave portion 72 into which the arm portion 52 of the bearing member 50 is fitted is formed in the partition wall 11 between the intake ports 2 adjacent to each other. In this way, by fitting the arm portion 52 into the fitting concave portion 72 of the partition wall 11, it is possible to suppress the occurrence of a position shift of the arm portion 52 (the bearing-side welding portion 56) when joining the bearing-side welding portion 56 by welding.

Further, in this embodiment, as described above, the wall-like portion 11a which is formed so as to surround the arm portion 52 and configures the inner side surface of the fitting concave portion 72 is formed in the partition wall 11. In this way, it is possible to prevent the occurrence of a position shift of the arm portion 52 in a direction along the welding surface (the A direction along the partition wall 11 between the intake ports 2 and the thickness direction X of the partition wall 11) by the wall-like portion 11a surrounding the arm portion 52.

Further, in this embodiment, as described above, the pedestal portion 11b which supports the arm portion 52 and configures the inner bottom surface of the fitting concave portion 72 is formed in the partition wall 11. Then, the hollow structure (the hollow portion 73) is formed in an area which is surrounded by the pedestal portion 11b, of the partition wall 11. In this way, it is possible to attain the thinning of a wall thickness by making the partition wall 11 hollow, and even in a case of joining the arm portion 52 while pressing it by, for example, vibration welding or the like, it is possible to support the arm portion 52 by the pedestal portion 11b. As a result, it is possible to suppress a dropout (to the hollow portion 73) or a position shift of the arm portion 52 by the pedestal portion 11b while attaining the thinning of the wall thickness of the partition wall 11 by providing the hollow structure (the hollow portion 73) in the partition wall portion on the lower surface side (the B2 side) of the arm portion 52.

Further, in this embodiment, as described above, the concave hollow portion 73 extending from the side on which the arm portion 52 is disposed, of the partition wall 11, to the opposite side (the B2 side) to the side on which the arm portion 52 is disposed is formed in the partition wall 11. In this way, it is possible to form the hollow structure (the hollow portion 73) in a wide range in the B2 direction from the arm portion 52. In this way, in addition to the thinning of the wall thickness of the partition wall portion by the hollow portion 73, it is possible to reduce material consumption of the intake device 100 and attain a reduction in the weight of the intake device 100.

Further, in this embodiment, as described above, in a state where the bearing member 50 is mounted on the main body portion 4a, the arm portion 52 of the bearing member 50 and the main body portion 4a are welded to the main body portion 4b. In this way, it is also possible to join the arm portion 52 of the bearing member 50 at the same time in a joining process of joining the main body portion 4a to the main body portion 4b by welding. Further, the bearing member 50 and the main body portion 4a are made of a resin, whereby it is also possible to attain the shortening of cooling time during the resin molding of the main body portion 4a according to the thinning of the wall thickness (a reduction of a thick portion) of the partition wall portion in which the arm portion 52 is disposed.

Further, in this embodiment, as described above, the arm portion 52 configuring the bearing-side welding portion 56 of the bearing member 50 is formed so as to be connected to the first welding portion 13 of the main body portion 4a. In this way, the bearing-side welding portion 56 of the bearing member 50 and the first welding portion 13 of the main body portion 4a are connected to each other and joined to the main body portion 4b, and therefore, it is possible to integrate the bearing member 50 and the main body portion 4a with the main body portion 4b so as to be strong and have high airtightness.

Further, in this embodiment, as described above, the valve body 32 for a variable intake valve provided so as to change the length of the intake port 2 by opening and closing the opening portion 24 between the surge tank 1 and the intake port 2 is provided in the intake device 100. In this way, in the variable intake type intake device 100 provided with the valve body 32 for a variable intake valve capable of changing an intake port length, it is possible to improve sealing properties of the valve body 32 by securing the dimensional accuracy of the partition wall portion in the vicinity of the bearing member 50 of the valve body 32. In this way, it is possible to reduce a leakage amount of intake air in a closed state of the valve body 32 associated with intake port length switching, and therefore, it is possible to improve the performance of the intake device 100.

In addition, it should be considered that the embodiment disclosed here is an exemplification in all respects and is not restrictive. The scope of this disclosure is shown in the appended claims, rather than the description of the embodiment described above, and all changes within the meaning and the scope equivalent to the appended claims are included therein.

For example, in the embodiment described above, an example in which the intake control valve and the intake device according to this disclosure are applied to an in-line four-cylinder engine for an automobile is shown. However, this disclosure is not limited thereto. The intake control valve and the intake device according to this disclosure may be applied to an internal combustion engine other than an engine for an automobile and may also be applied to an internal combustion engine other than an in-line four-cylinder engine.

Further, in the embodiment described above, an example in which the intake control valve according to this disclosure is applied to an intake control valve for variable intake which changes an intake path length is shown. However, this disclosure is not limited thereto. The intake control valve according to this disclosure may be applied to a tumble control valve (TCV) generating a longitudinal vortex, a swirl control valve (SCV) generating a transverse vortex, or the like other than the intake control valve for variable intake. This disclosure is also applicable to any intake control valve as long as it has a configuration in which a valve body disposed in an intake device is rotatably supported by a bearing member.

Further, in the embodiment described above, an example in which the arm portion of the bearing member is formed so as to extend from the bearing main body to both sides in the longitudinal direction A along the partition wall between the intake ports is shown. However, this disclosure is not limited thereto. In this disclosure, the arm portion may be provided so as to extend to only one side in the longitudinal direction.

Further, in the embodiment described above, an example in which the arm portions of the bearing member are formed so as to extend in lengths (L1 and L2) extending over the formation range of the seal surface along the partition wall between the intake ports is shown. However, this disclosure is not limited thereto. In this disclosure, the arm portion may be formed so as to extend in at least a length larger than the inner diameter d of the bearing hole. Therefore, the length of the arm portion may be smaller than the lengths L1 and L2 and may also be larger than the lengths L1 and L2. In addition, the lengths of the arm portions may also have the same length (L1=L2) on both sides in the longitudinal direction A along the partition wall.

Further, in the embodiment described above, an example in which the fitting concave portion into which the arm portion of the bearing member is fitted is formed in the partition wall 11 between the intake ports adjacent to each other is shown. However, this disclosure is not limited thereto. In this disclosure, the fitting concave portion may not be formed in the upper surface of the partition wall 11.

Further, in the embodiment described above, an example in which the wall-like portion which is formed so as to surround the arm portion and configures the inner side surface of the fitting concave portion is formed in the partition wall 11 is shown. However, this disclosure is not limited thereto. In this disclosure, the wall-like portion may not surround the arm portion. For example, the wall-like portion may be formed on only one side in the axial direction X with respect to the arm portion.

Further, in the embodiment described above, an example in which the hollow structure (the hollow portion) is provided in an area which is surrounded by the pedestal portion of the fitting concave portion, of the partition wall, is shown. However, this disclosure is not limited thereto. In this disclosure, the hollow portion need not be surrounded by the pedestal portion. For example, the hollow portion may be disposed next to the pedestal portion. That is, in the fitting concave portion, a configuration is also acceptable in which a pedestal portion is formed on the leading end side of the arm portion and a hollow portion is formed on the base side (the bearing main body side) of the arm portion.

Further, in the embodiment described above, an example in which the negative pressure actuator is provided at the intake control valve is shown. However, this disclosure is not limited thereto. In this disclosure, an electric actuator or the like other than the negative pressure actuator may be provided at the intake control valve. The actuator may be any actuator as long as it is an actuator which applies rotary torque (a driving force) to a rotating shaft of a valve body.

A first aspect of this disclosure is directed to an intake device including: a plurality of intake ports which are adjacent to each other with a partition wall interposed therebetween; a valve body provided for each of the plurality of intake ports; a rotating shaft which rotates along with the valve body; and a bearing member which is disposed between the intake ports adjacent to each other and rotatably supports the rotating shaft of the valve body, in which the bearing member includes a bearing main body having a bearing hole which rotatably supports the rotating shaft, and an arm portion which extends in a length larger than an inner diameter of the bearing hole from the bearing main body along the partition wall between the intake ports adjacent to each other and configures a bearing-side welding portion.

In the intake device according to the first aspect of this disclosure, as described above, by providing the bearing member which includes a bearing main body having a bearing hole which rotatably supports the rotating shaft, and an arm portion which extends in a length larger than the inner diameter of the bearing hole from the bearing main body along the partition wall between the intake ports adjacent to each other and configures a bearing-side welding portion, it is possible to make a range of the bearing-side welding portion along the partition wall between the intake ports adjacent to each other larger (longer) by an amount corresponding to providing the arm portion. In this way, with respect to a partition wall portion in which the arm portion of the bearing member is disposed (a partition wall portion which is located on the lower (back) side of the arm portion), the need to form a welding portion on the partition wall side is eliminated, and therefore, it is possible to form a hole or a groove for making a hollow structure in the partition wall from the welding surface side. As a result, it is possible to thin the wall thickness of a partition wall portion in the vicinity of the bearing member, which has been made thick in the related art, by forming a hole or a groove in the partition wall portion in which the arm portion (the bearing-side welding portion) of the bearing member is disposed, and therefore, it is possible to secure the dimensional accuracy of the partition wall portion (the seal surface by the valve body) in the vicinity of the bearing member.

In the intake device according to the first aspect described above, it is preferable that a portion in which the arm portion of the bearing member is disposed, of the partition wall between the intake ports adjacent to each other, has a hollow structure. According to such a configuration, it is possible to easily thin a wall thickness by making the partition wall portion in which the arm portion (the bearing-side welding portion) of the bearing member is disposed (the partition wall portion which is located on the lower side of the arm portion) hollow, and therefore, it is possible to easily secure the dimensional accuracy of the partition wall portion (the seal surface by the valve body) in the vicinity of the bearing member.

In the intake device according to the first aspect described above, it is preferable that the arm portion is provided so as to extend to be continuous to an upper surface of the bearing main body and configure the bearing-side welding portion together with the upper surface of the bearing main body. According to such a configuration, it is possible to solidly fix an upper surface portion of the bearing member which includes the arm portion and the bearing main body by welding and it is possible to obtain high airtightness in a joint portion of the bearing-side welding portion.

In the intake device according to the first aspect described above, it is preferable that the arm portion of the bearing member is formed so as to extend from each of side end portions on both sides of the bearing main body to each of both sides in a direction along the partition wall between the intake ports. According to such a configuration, it is possible to provide the arm portion in a wide range on both sides of the bearing main body. In this way, it is possible to thin the wall thickness of the partition wall portion in a wider range around the bearing member, and therefore, it is possible to secure the dimensional accuracy of the partition wall portion (the seal surface by the valve body) in a wider range around the bearing member.

In the intake device according to the first aspect described above, it is preferable that the intake port includes a seal surface which comes into contact with the valve body in a closed state of the valve body, and the arm portion of the bearing member is formed so as to extend in a length extending over a formation range of the seal surface along the partition wall between the intake ports. According to such a configuration, it is possible to thin the wall thickness of the partition wall portion over the entire formation range of the seal surface along the partition wall, and therefore, it is possible to secure the dimensional accuracy of the partition wall portion (the dimensional accuracy of the seal surface) in the entire formation range of the seal surface along the partition wall.

In the intake device according to the first aspect described above, it is preferable that the partition wall between the intake ports adjacent to each other has a concave portion into which the arm portion of the bearing member is fitted. According to such a configuration, by fitting the arm portion into the concave portion of the partition wall, it is possible to suppress the occurrence of a position shift of the arm portion (the bearing-side welding portion) when joining the bearing-side welding portion by welding.

In this case, it is preferable that the partition wall has a wall-like portion which is formed so as to surround the arm portion and configures an inner side surface of the concave portion. According to such a configuration, by the wall-like portion surrounding the arm portion, it is possible to prevent the arm portion from causing a position shift in a direction along a welding surface (a direction along the partition wall between the intake ports and a thickness direction of the partition wall).

In the configuration in which the partition wall has a concave portion, it is preferable that the partition wall has a pedestal portion which supports the arm portion and configures an inner bottom surface of the concave portion, and a hollow structure is provided in an area which is surrounded by the pedestal portion, of the partition wall. According to such a configuration, it is possible to attain the thinning of a wall thickness by making the partition wall hollow, and even in a case of joining the arm portion while pressing it by, for example, vibration welding or the like, it is possible to support the arm portion by the pedestal portion. In this way, it is possible to suppress dropout (to the hollow structure) or a position shift of the arm portion by the pedestal while attaining the thinning of the wall thickness of the partition wall by providing a hollow structure in the partition wall portion on the lower surface side of the arm portion.

In the configuration in which a portion in which the arm portion is disposed, of the partition wall between the intake ports adjacent to each other, has a hollow structure, it is preferable that the hollow structure of the partition wall includes a hollow portion of a concave shape, which extends from a side on which the arm portion is disposed, of the partition wall, to the opposite side to the side on which the arm portion is disposed. According to such a configuration, it is possible to form the hollow structure (the hollow portion) in a wide range in a direction of the opposite side to the side on which the arm portion is disposed. In this way, in addition to the thinning of the wall thickness of the partition wall portion by the hollow portion, it is possible to reduce material consumption of the intake device and attain a reduction in the weight of the intake device.

In the intake device according to the first aspect described above, it is preferable that the bearing member is made of a resin, the intake device further includes a first intake device main body made of a resin, on which the bearing member is mounted, and a second intake device main body made of a resin, which is joined to the first intake device main body by welding, and in a state where the bearing member is mounted on the first intake device main body, the arm portion of the bearing member and the first intake device main body are welded to the second intake device main body. According to such a configuration, it is also possible to join the arm portion of the bearing member at the same time in a joining process of joining the first intake device main body to the second intake device main body by welding. Further, the bearing member and the first intake device main body are made of a resin, whereby it is also possible to attain the shortening of cooling time during the resin molding of the first intake device main body according to the thinning of the wall thickness (a reduction of a thick portion) of the partition wall portion in which the arm portion is disposed.

In this case, it is preferable that main body-side welding portions are respectively formed at the first intake device main body and the second intake device main body along each other's joint portions, and the arm portion configuring the bearing-side welding portion of the bearing member is formed so as to be connected to the main body-side welding portion of the first intake device main body. According to such a configuration, the bearing-side welding portion of the bearing member and the main body-side welding portion of the first intake device main body are connected to each other and joined to the second intake device main body, and therefore, it is possible to integrate the bearing member and the first intake device main body with the second intake device main body so as to be strong and have high airtightness.

In the intake device according to the first aspect described above, it is preferable that the valve body is a valve body for a variable intake valve provided so as to change a length of the intake port by opening and closing an opening portion between a surge tank and the intake port. According to such a configuration, in a variable intake type intake device provided with a valve body for a variable intake valve capable of changing an intake port length, it is possible to improve sealing properties of the valve body by securing the dimensional accuracy of the partition wall portion in the vicinity of the bearing member of the valve body for a variable intake valve. In this way, it is possible to reduce a leakage amount of intake air in a closed state of the valve body associated with intake port length switching, and therefore, it is possible to improve the performance of the intake device.

A second aspect of this disclosure is directed to an intake control valve including: a valve body provided for each of a plurality of intake ports which are adjacent to each other with a partition wall interposed therebetween; a rotating shaft which rotates along with the valve body; and a bearing member which is disposed between the intake ports adjacent to each other and rotatably supports a rotating shaft of the valve body, in which the bearing member includes a bearing main body having a bearing hole which rotatably supports the rotating shaft, and an arm portion which extends in a length larger than an inner diameter of the bearing hole from the bearing main body along the partition wall between the intake ports adjacent to each other and configures a bearing-side welding portion.

In the intake control valve according to the second aspect of this disclosure, as described above, by providing the bearing member which includes a bearing main body having a bearing hole which rotatably supports the rotating shaft, and an arm portion which extends in a length larger than the inner diameter of the bearing hole from the bearing main body along the partition wall between the intake ports adjacent to each other and configures a bearing-side welding portion, it is possible to make a range of the bearing-side welding portion along the partition wall between the intake ports adjacent to each other larger (longer) by an amount corresponding to providing the arm portion. In this way, with respect to a partition wall portion in which the arm portion (the bearing-side welding portion) of the bearing member is disposed (a partition wall portion which is located on the lower side of the arm portion), the need to form a welding portion on the partition wall side is eliminated, and therefore, it is possible to form a hole or a groove for making a hollow structure in the partition wall from the welding surface side. As a result, it is possible to thin a wall thickness by forming a hole or a groove in the partition wall portion in which the arm portion (the bearing-side welding portion) of the bearing member is disposed, and therefore, it is possible to secure the dimensional accuracy of the partition wall portion (the seal surface by the valve body) in the vicinity of the bearing member of an intake device main body on which the intake control valve is mounted.

In addition to the intake device according to the first aspect described above and the intake control valve according to the second aspect described above, another configuration as described below is also conceivable in this disclosure.

That is, an intake device according to another configuration of this disclosure includes a plurality of intake ports which are adjacent to each other with a partition wall interposed therebetween; a valve body provided for each of the plurality of intake ports; a rotating shaft which rotates along with the valve body; and a bearing member which is disposed between the intake ports adjacent to each other and rotatably supports a rotating shaft of the valve body, in which the bearing member includes an arm portion extending along the partition wall between the intake ports adjacent to each other and configuring a bearing-side welding portion, and a portion in which the arm portion of the bearing member is disposed, of the partition wall, between the intake ports adjacent to each other, has a hollow structure. According to such a configuration, it is possible to thin a wall thickness by making a partition wall portion in which the arm portion (the bearing-side welding portion) of the bearing member is disposed (a partition wall portion which is located on the lower side of the arm portion) hollow, and therefore, it is possible to secure the dimensional accuracy of a partition wall portion (a seal surface by the valve body) in the vicinity of the bearing member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An intake device comprising:
   a plurality of intake ports which are adjacent to each other with a partition wall interposed therebetween;
   a valve body provided for each of the plurality of intake ports;
   a rotating shaft which rotates along with the valve body;
   a bearing member which is disposed in a portion of the partition wall between adjacent intake ports and rotatably supports the rotating shaft of the valve body,
   the bearing member includes a bearing main body having a bearing hole which rotatably supports the rotating shaft, and an arm portion possessing first and second end portions, the first and second end portions being disposed on opposite sides of the bearing main body in a longitudinal direction along the partition wall between the adjacent intake ports, the first and second end portions extending a first length and a second length, respectively, from the bearing main body, the first and second lengths each being larger than an inner diameter of the bearing hole, and forming a bearing-side welding portion;
   the portion of the partition wall between the adjacent intake ports, in which the bearing member is disposed, is a hollow structure, the hollow structure including first and second hollow portions which correspond to the first and second end portions of the arm portion
   wherein the partition wall includes a concave portion in which the arm portion of the bearing member is fitted and a pedestal portion which supports the arm portion and is an inner bottom surface of the concave portion, and
   a hollow structure is provided in an area surrounded by the pedestal portion of the partition wall.

2. The intake device according to claim 1, wherein the arm portion is provided so as to extend to be continuous to an upper surface of the bearing main body and configure the bearing-side welding portion together with the upper surface of the bearing main body.

3. The intake device according to claim 1, wherein the intake port includes a seal surface which comes into contact with the valve body in a closed state of the valve body, and
   the arm portion of the bearing member is formed so as to extend in a length extending over a formation range of the seal surface along the partition wall between the intake ports.

4. The intake device according to claim 1, wherein the partition wall has a wall-like portion which is formed so as to surround the arm portion and configures an inner side surface of the concave portion.

5. The intake device according to claim 1, wherein the hollow structure of the partition wall includes a hollow portion of a concave shape, which extends from a side of the partition wall, on which the first end portion of the arm portion is disposed, to the opposite side of the partition wall, on which the second end portion of the arm portion is disposed.

6. The intake device according to claim 1, wherein the bearing member is made of a resin,
   the intake device further includes a first intake device main body made of a resin, on which the bearing member is mounted, and a second intake device main body made of a resin, which is joined to the first intake device main body by welding, and
   in a state where the bearing member is mounted on the first intake device main body, the arm portion of the bearing member and the first intake device main body are welded to the second intake device main body.

7. The intake device according to claim 6, wherein main body-side welding portions are respectively formed at the first intake device main body and the second intake device main body along each other's joint portions, and
   the arm portion configuring the bearing-side welding portion of the bearing member is formed so as to be connected to the main body-side welding portion of the first intake device main body.

8. The intake device according to claim 1, wherein the valve body is a valve body for a variable intake valve provided so as to change a length of the intake port by opening and closing an opening portion between a surge tank and the intake port.

9. The intake device according to claim 1, wherein an entire length of the bearing member in the longitudinal direction along the partition wall is approximately the same as a length of an opening portion of the intake port in the longitudinal direction along the partition wall.

10. The intake device according to claim 1, wherein the hollow portion is configured by being closed by the arm portion.

11. An intake control valve comprising:
    a valve body provided for each of a plurality of intake ports which are adjacent to each other with a partition wall interposed therebetween;
    a rotating shaft which rotates along with the valve body;
    a bearing member which is disposed in a portion of the partition wall between the adjacent intake ports and rotatably supports the rotating shaft of the valve body,
    the bearing member includes a bearing main body having a bearing hole which rotatably supports the rotating shaft, and an arm portion possessing first and second end portions, the first and second end portions being disposed on opposite sides of the bearing main body in a longitudinal direction along the partition wall between the adjacent intake ports, the first and second end portions extending a first length and a second length, respectively, from the bearing main body, the first and second lengths each being larger than an inner diameter of the bearing hole, and forming a bearing-side welding portion;
    the portion of the partition wall between the adjacent intake ports, in which the bearing member is disposed, is a hollow structure, the hollow structure including first and second hollow portions which correspond to the first and second end portions of the arm portion
    wherein the partition wall includes a concave portion in which the arm portion of the bearing member is fitted and a pedestal portion which supports the arm portion and is an inner bottom surface of the concave portion, and a hollow structure is provided in an area surrounded by the pedestal portion of the partition wall.

* * * * *